US011567569B2

(12) United States Patent
Spencer et al.

(10) Patent No.: US 11,567,569 B2
(45) Date of Patent: Jan. 31, 2023

(54) OBJECT SELECTION BASED ON EYE TRACKING IN WEARABLE DEVICE

(71) Applicant: Google LLC, Mountain View, CA (US)

(72) Inventors: Jason Todd Spencer, Rocklin, CA (US); Seth Raphael, Portland, OR (US); Sofien Bouaziz, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/301,588

(22) Filed: Apr. 8, 2021

(65) Prior Publication Data
US 2022/0326766 A1 Oct. 13, 2022

(51) Int. Cl.
*G06F 3/01* (2006.01)
*G06V 10/75* (2022.01)

(52) U.S. Cl.
CPC ............ *G06F 3/013* (2013.01); *G06V 10/751* (2022.01)

(58) Field of Classification Search
CPC ............................. G06F 3/013; G06V 10/751
See application file for complete search history.

(56) References Cited

U.S. PATENT DOCUMENTS

| 11,093,033 B1* | 8/2021 | Wang ......................... G06T 7/70 |
| 2012/0290401 A1* | 11/2012 | Neven ..................... G06V 20/20 |
| | | 382/103 |
| 2013/0179303 A1* | 7/2013 | Petrou ................ G06Q 30/0623 |
| | | 705/26.61 |
| 2017/0242481 A1 | 8/2017 | Lu et al. |
| 2018/0157045 A1 | 6/2018 | Davami |

FOREIGN PATENT DOCUMENTS

EP 1209553 A1 5/2002

\* cited by examiner

*Primary Examiner* — Mark Edwards
*Assistant Examiner* — Chayce R Bibbee
(74) *Attorney, Agent, or Firm* — Brake Hughes Bellermann LLP

(57) ABSTRACT

A wearable computing device includes a frame, a camera mounted on the frame so as to capture images of an environment outside of the wearable computing device, a display device mounted on the frame so as to display the images captured by the camera, and at least one eye gaze tracking device mounted on the frame so as to track a gaze directed at the images displayed by the display device. In response to the detection of a fixation of the gaze on the display of images, the system may identify a pixel area corresponding to a fixation point of the fixation gaze on the display of images. The system may identify an object in the ambient environment corresponding to the identified pixel area, and set the identified object as a selected object for user interaction.

19 Claims, 14 Drawing Sheets

400

```
┌─────────────────────────────────────┐
│ Operate wearable device including   │
│ world facing camera and display device │
│                                 410 │
└─────────────────────────────────────┘
                  │
                  ▼
┌─────────────────────────────────────┐
│ Display images of portions of ambient environment │
│ captured within field of view of camera │
│                                 420 │
└─────────────────────────────────────┘
                  │
                  ▼
         ◇ Select Mode detected? 430 ◇  ── No ──┐
                  │ Yes                          │
                  ▼                              │
┌─────────────────────────────────────┐          │
│ Operate gaze tracking device(s)     │          │
│                                 440 │          │
└─────────────────────────────────────┘          │
                  │                              │
                  ▼                              │
         ◇ Gaze fixation detected? 450 ◇ ── No ──┤
                  │ Yes
                  ▼
┌─────────────────────────────────────┐
│ Match gaze fixation point with pixel area │
│ of image displayed by display device │
│                                 460 │
└─────────────────────────────────────┘
                  │
                  ▼
┌─────────────────────────────────────┐
│ Select object for interaction based on matching │
│                                 470 │
└─────────────────────────────────────┘
```

FIG. 4

OBJECT SELECTION BASED ON EYE TRACKING IN WEARABLE DEVICE

TECHNICAL FIELD

This description generally relates to object selection in a wearable device, and in particular, to world object selection in a wearable device based on eye tracking information.

BACKGROUND

Wearable computing devices can include, for example, head mounted display devices including smart glasses and the like, arm/wrist/hand worn devices including smart watches, smart bracelets/bands, smart rings, smart pendants and the like, headphones/ear buds, and other such devices. Users can interact with content made available by wearable computing devices, can capture and/or process and/or access information using wearable computing devices, and can rely on wearable devices to interact with content made available by the wearable device.

SUMMARY

In a first general aspect, a computer-implemented method includes capturing, by a camera mounted on a frame of a wearable computing device, images of an ambient environment outside of the wearable computing device; triggering display, by a display device mounted on the frame of the wearable computing device, of the images captured by the camera; tracking, by at least one gaze tracking device mounted on the frame of the wearable computing device, a user gaze directed at the display of the images by the display device; identifying a pixel area, of a plurality of pixel areas of the display of images of the display device, corresponding to the detected user gaze; and matching the identified pixel area with a corresponding object in the ambient environment.

In some implementations, the wearable computing device is a head mounted display device including the frame, with the camera, the display device and the at least one gaze tracking device all mounted to the frame, and the display device projecting the images of the ambient environment captured by the camera onto a lens of the head mounted display device.

In some implementations, capturing images of the ambient environment includes capturing portions of the ambient environment within a field of view of the camera as the wearable computing device changes at least one of position or orientation in the ambient environment. In some implementations, tracking the user gaze includes tracking, by at least one eye gaze tracking device, eye gaze of at least one eye of a user of the wearable computing device.

In some implementations, tracking user gaze directed at the display of the images and identifying the pixel area corresponding to the detected user gaze includes detecting a fixation gaze including fixation of the user gaze directed at the display of the images; identifying a fixation point of the detected fixation gaze at an intersection of the fixation gaze with the display of the images; and identifying the pixel area at the intersection of the fixation gaze with the display of the images. In some implementations, detecting the fixation of the user gaze includes detecting movement of the user gaze of less than or equal to a previously set threshold of movement of the user gaze. In some implementations, detecting movement of the user gaze includes detecting at least one of a magnitude or a frequency associated with the detected movement. In some implementations, identifying the pixel area includes identifying a pixel within the display of the images at which the fixation gaze intersects the display of the images.

In some implementations, matching the identified pixel area with the corresponding object in the ambient environment includes analyzing an area surrounding the identified pixel area; identifying features within the area surrounding the identified pixel area based on the analyzing; recognizing at least one of the identified features; and matching the pixel area to the corresponding object based on the at least one identified feature. In some implementations, recognizing at least one of the identified features includes at least one of recognizing at least one of the identified features based on a search of an external database of previously stored images; or recognizing at least one of the identified features based on known features of the ambient environment.

In some implementations, the tracking of the user gaze, the identifying of the pixel area, and the matching of the identified pixel area to the corresponding object in the ambient environment includes initiating, by a processor of the wearable computing device, a select mode of operation of the wearable computing device in response to at least one of a detected user input or detection of a stationary condition of the wearable computing device for greater than or equal to a previously set threshold of time; and performing the tracking, the identifying and the matching only during operation of the wearable computing device in the select mode.

In another general aspect, a computing system includes a wearable computing device, including a frame; a camera coupled to the frame so as to capture images of an ambient environment outside of the wearable computing device; a display device coupled to the frame; at least one gaze tracking device coupled to the frame; at least one processing device; and a memory storing instructions. The instructions, when executed, cause the system to perform operations capturing, by the camera, images of the environment outside of the wearable computing device; displaying, by the display device, the images captured by the camera; tracking, by the at least one gaze tracking device, a gaze of a user of the wearable computing device directed at the display of the images by the display device; identifying a pixel area, of a plurality of pixel areas of the display of images of the display device, corresponding to the detected user gaze; and matching the identified pixel area with a corresponding object in the ambient environment.

In some implementations, the camera is configured to capture images of portions of the ambient environment within a field of view of the camera as the wearable computing device changes at least one of position or orientation in the ambient environment, such that the instructions cause the system to perform operations including detecting a fixation gaze including fixation of an eye gaze of the user directed at the display of the images; identifying a fixation point of the detected fixation gaze at an intersection of the fixation gaze with the display of the images; and identifying the pixel area at the intersection of the fixation gaze with the display of the images. In some implementations, the instructions cause the system to perform operations including analyzing an area surrounding the identified pixel area; identifying features within the area surrounding the identified pixel area based on the analyzing; recognizing at least one of the identified features; and matching the pixel area to the corresponding object based on the at least one identified feature. In some implementations, the instructions cause the system to perform operations including searching an external database of previously stored images to identify at least one of the identified features and match the identified at least one feature to an object in the ambient environment; or recognizing at least one of the identified features based on known features of the ambient environment.

In some implementations, the instructions also cause the system to perform operations including detecting a condition for entering a select mode of operation of the wearable computing device; initiating operation of the wearable computing device in the select mode in response to the detected condition; and performing the tracking, the identifying and the matching only during operation of the wearable computing device in the select mode.

In another general aspect, a non-transitory, machine-readable medium has instructions stored thereon that, when executed by a processor, cause a computing device to perform operations including capturing, by a camera mounted on a frame of a wearable computing device, images of objects within a field of view of the camera in an ambient environment outside of the wearable computing device; triggering display, by a display device mounted on the frame of the wearable computing device, of the images captured by the camera; tracking, by at least one gaze tracking device mounted on the frame of the wearable computing device, a user gaze directed at the display of the images by the display device; identifying a pixel area, of a plurality of pixel areas of the display of images of the display device, corresponding to the detected user gaze; and matching the identified pixel area with a corresponding object in the ambient environment.

In some implementations, the instructions also cause the computing device to perform operations including detecting a condition for entering a select mode of operation of the wearable computing device; initiating operation of the wearable computing device in the select mode in response to the detected condition; and performing the tracking, the identifying and the matching only during operation of the wearable computing device in the select mode. In some implementations, the instructions also cause the computing device to perform operations including tracking, by the at least one gaze tracking device, eye gaze of at least one eye of a user of the wearable computing device; detecting a fixation gaze including fixation of the user eye gaze directed at the display of the images; identifying a fixation point of the detected fixation gaze at an intersection of the fixation gaze with the display of the images; and identifying the pixel area at the intersection of the fixation gaze with the display of the images.

In some implementations, the instructions also cause the computing device to perform operations including analyzing an area surrounding the identified pixel area; identifying features within the area surrounding the identified pixel area based on the analyzing; recognizing at least one of the identified features; and matching the pixel area to the corresponding object based on the at least one identified feature. In some implementations, the instructions also cause the computing device to perform operations including setting the corresponding object as a selected object; and providing for interaction with the selected object through the wearable computing device.

Implementations of the described techniques may include hardware, a method or process, or computer software on a computer-readable medium. The details of one or more implementations are set forth in the accompanying drawings and the description below. Other features will be apparent from the description and drawings, and from the claims.

BRIEF DESCRIPTION OF THE DRAWINGS

FIG. 4 is a flowchart of a method, according to implementations described throughout this disclosure.

Like reference symbols in the various drawings indicate like elements.

DETAILED DESCRIPTION

This document describes examples related to real world object identification and selection for electronic wearable devices. The object identification and selection may include the use of sensors of the wearable device that allow the wearable device to capture and assess an ambient environment surrounding the wearable device. The object identification and selection may also include the use of sensors of the wearable device that provide for user gaze tracking, for example, eye gaze tracking. Correlation between a detected gaze, for example, eye gaze of the user and a representation of the real world view of the ambient environment, captured by a camera of the wearable device and presented to the user by a display device of the wearable device, may allow the user gaze to be isolated to a specific portion of the representation of the real world view, or to a specific pixel area of the display device. This may in turn allow the object on which the user gaze is focused to be identified for selection.

Systems and methods, in accordance with implementations described herein, provide an advantage of quickly and accurately identifying an object of interest to a user based on a detected gaze, rather than relying on other forms of user interaction and/or input for object selection. Other forms of interaction and/or input for object identification and/or selection may rely on the detection of, for example gestural input commands, touch input commands, audible input commands and the like. The use of these types of input methods for interaction may be disruptive in some environments. Further, identification of objects for which the input is intended and/or a particular action to be taken may be somewhat inaccurate when using these types of input methods. Systems and methods, in accordance with implementations described herein, may solve these technical challenges, or technical problems. Systems and methods, in accordance with implementations described herein, may provide for user interaction with objects made available to the user via a mobile computing device through the use of a gaze input mode, allowing the user to interact with content, select and interact with objects and the like in a less disruptive, relatively discreet manner. Information collected by an eye gaze tracking device may be correlated with information related to the display of content to the user, to isolate an object, and in particular a pixel area, at which the user gaze is directed. Isolation of the user gaze to a particular pixel area, or pixel, may yield improved accuracy in identification of the object on which the user gaze is focused, and/or improved accuracy in the identification of the user input command associated with the detected user gaze.

Figure 1A:
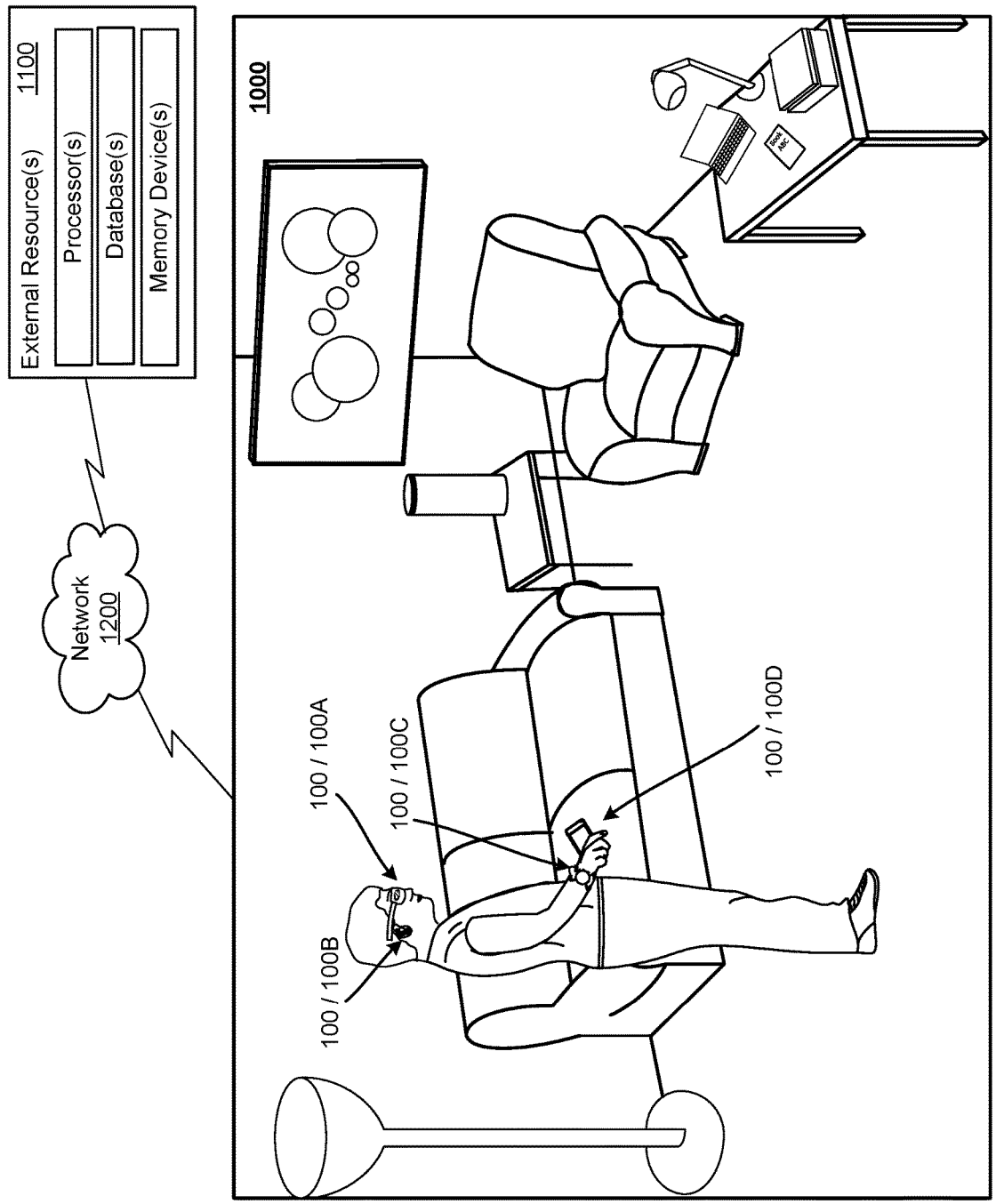
FIGS. 1A-1C illustrate examples of wearable devices in which user interaction with objects can be tracked and objects can be selected, according to implementations described throughout this disclosure.

FIG. 1A illustrates a system in which a user can use one or more wearable devices 100 to access one or more external resources 1100 via network 1200. FIG. 1A provides a third person view of a user in an ambient environment 1000, including various examples of mobile computing devices 100. FIG. 1A shows example mobile computing devices 100 including a first head worn wearable computing device 100A, a second head worn wearable computing device 100B, a wrist worn computing device 100C, and a handheld computing device 100D. In some examples, the first head worn computing device 100A can include various components including for example a display, a camera that can capture images of the ambient environment, audio input/output capability, user input capability and the like, such as in a head mounted display device, in the form of smart glasses, or a headset. In some examples, the second head worn computing device 100B can be an ear worn computing device such as headphones, or earbuds, and can include audio input/output capability, a camera that can capture images of the ambient environment, user input capability and the like. In some examples, the wrist worn computing device 100C can include a display, a camera that can capture images of the ambient environment, audio input/output capability, user input capability and the like, such as in a smart watch, or wristband. In some examples, the handheld computing device 100D can include a display, a camera that can capture images of the ambient environment, audio input/output capability, user input capability, and the like, such as in a smartphone. FIG. 1A illustrates just some examples of mobile computing devices. The principles to be described herein may be applied to other types of mobile computing devices, including wearable computing devices, not specifically shown in FIG. 1A. In some examples, mobile computing devices 100, including wearable devices such as the example devices shown in FIG. 1A, can communicate with each other and/or with the external resources 1100, to exchange information, to receive and transmit input and/or output, and the like.

Figure 1B:
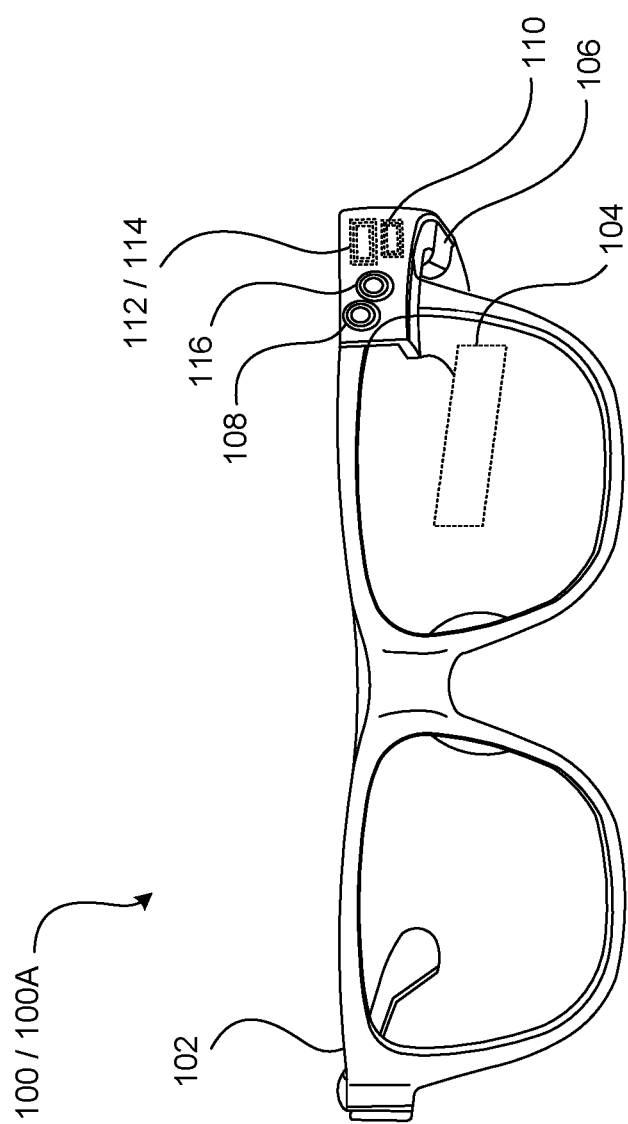
Figure 1C:
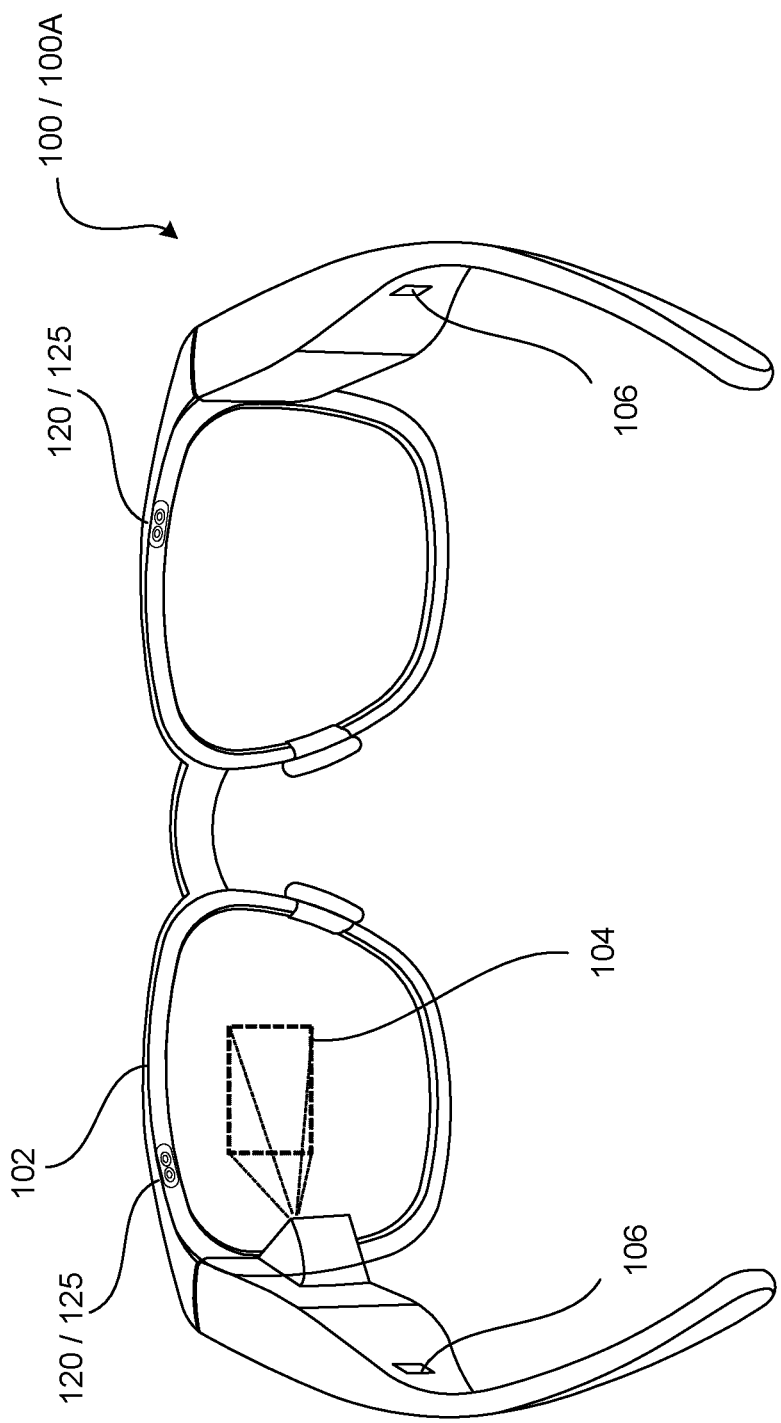

FIG. 1B is a front view, and FIG. 1C is a rear view, of the example of the wearable computing device 100A shown in FIG. 1A, in the form of a head mounted display (HMD) device. In some implementations, the example HMD may take the form of a pair of smart glasses, or augmented reality glasses, or an augmented reality and/or virtual reality headset or goggles. Hereinafter, systems and methods in accordance with implementations described herein will be described with respect to the wearable computing device 100 in the form of an HMD, simply for ease of discussion and illustration. The principles to be described herein can be applied to other types of mobile computing devices and/or combinations of mobile computing devices working together, including the example mobile computing devices described with respect to FIG. 1A, that are capable of image capture and display, and capable of gaze tracking for object identification and selection.

As shown in FIG. 1B, the example HMD 100 includes a frame 102. In the example shown in FIGS. 1B and 1C, the frame 102 includes a rim portion surrounding glass portion(s), or lenses, and arm portions coupled to the rim portion. A display device 104 coupled in a portion of the frame 102. In the example shown in FIGS. 1B and 1C, the display device 104 is coupled in the arm portion of the frame 102. The HMD 100 can also include an audio output device 106, an illumination device 108, a sensing system 110, a control system 112, at least one processor 114, and an outward facing image sensor 116, or camera 116. In some implementations, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world next to digital images (e.g., user interface elements, virtual content, etc.) generated by the display device 104. In some implementations, waveguide optics may be used to depict content on the display device 104 of the HMD 100.

The audio output device 106 may include one or more speakers coupled to the frame 102. The sensing system 110 may include various sensing devices and the control system 112 may include various control system devices to facilitate operation of the HMD 100 including, for example, one or more processors 114 operably coupled to the components of the control system 112. In some implementations, the control system 112 may include a communication module providing for communication and exchange of information between the HMD 100 and other external devices.

In some implementations, the camera 116 may be an outward facing camera 116, or a world facing camera 116 that is capable of capturing still and/or moving images of external objects in the ambient environment within a field of view of the camera 116. In some implementations, the camera 116 may be a depth camera that can collect data related to distances of the external objects from the camera 116. In some implementations, the illumination device 108 may selectively operate, for example, with the camera 116, for detection of objects in the field of view of the camera 116.

As shown in FIG. 1C, in some implementations, the HMD 100 includes a gaze tracking device 120 including, for example, one or more sensors 125 for example, one or more image sensors 125. The gaze tracking device 120 may detect and track eye gaze direction and movement. Images captured by the sensor(s) 125 may be processed to detect and track gaze direction and movement, and to detect gaze fixation. In some implementations, the detected gaze may be processed as a user input to be translated into a corresponding interaction with external objects in the ambient environment 1000 that are visible to the user through the HMD 100 and/or interaction with objects displayed to the user by the display device 104.

FIGS. 2A-2H illustrate an example system and method of real world object identification and/or selection, in accordance with implementations described herein. An example of real world object identification and/or selection by the user will be described hereinafter with respect to the use of one of the mobile computing devices 100 described above, particular the first wearable computing device in the form of the head mounted display device, or smart glasses, simply for ease of discussion and illustration. The principles to be described herein may be applied to other mobile computing devices, and/or may be applicable to multiple paired devices that can communicate with each other for the exchange of information, the detection and transmission of inputs and commands, and the like.

Figure 2A:
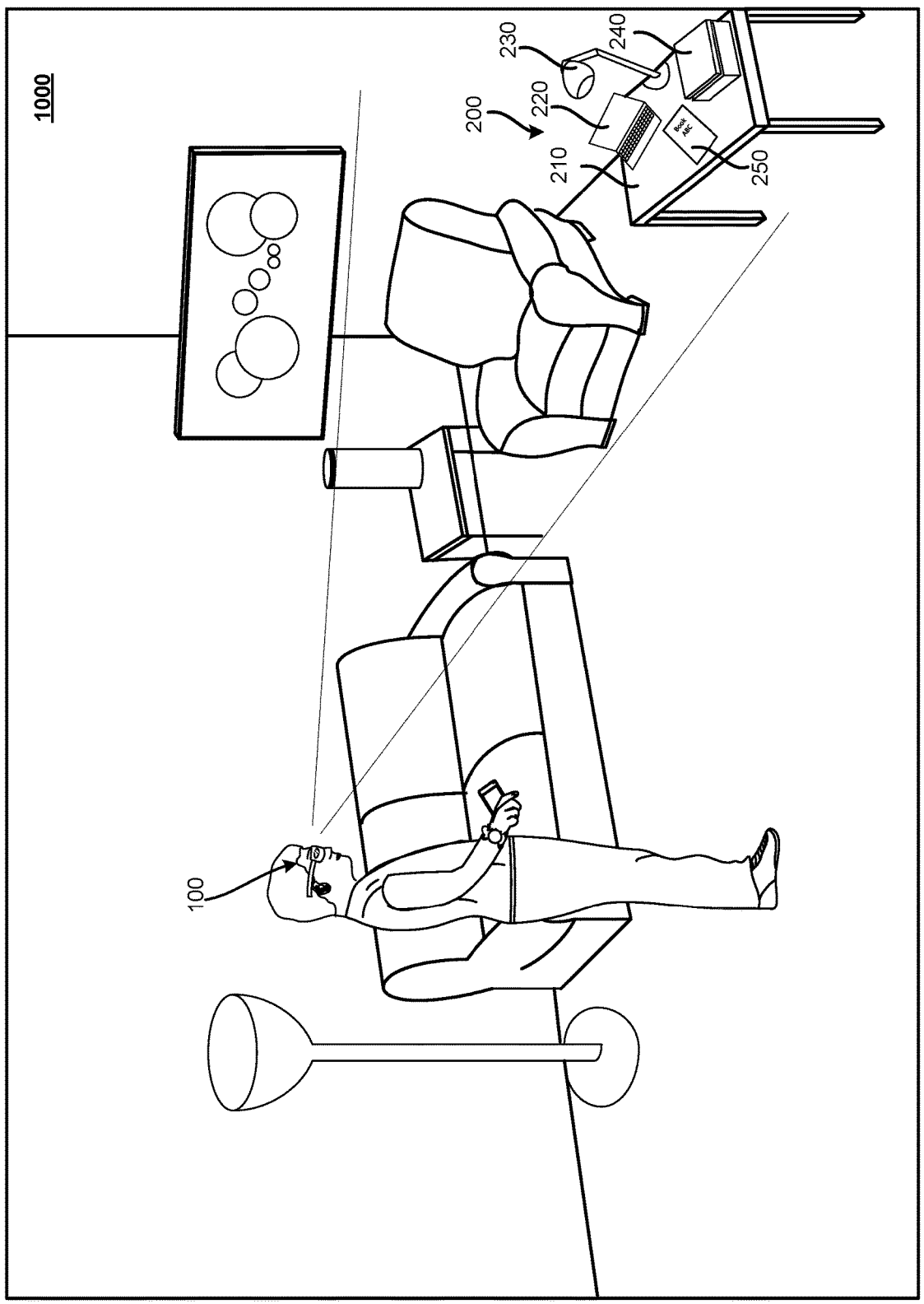
FIGS. 2A-2H illustrate operation of an example system and method object selection using a wearable computing device, according to implementations described throughout this disclosure.
Figure 2B:
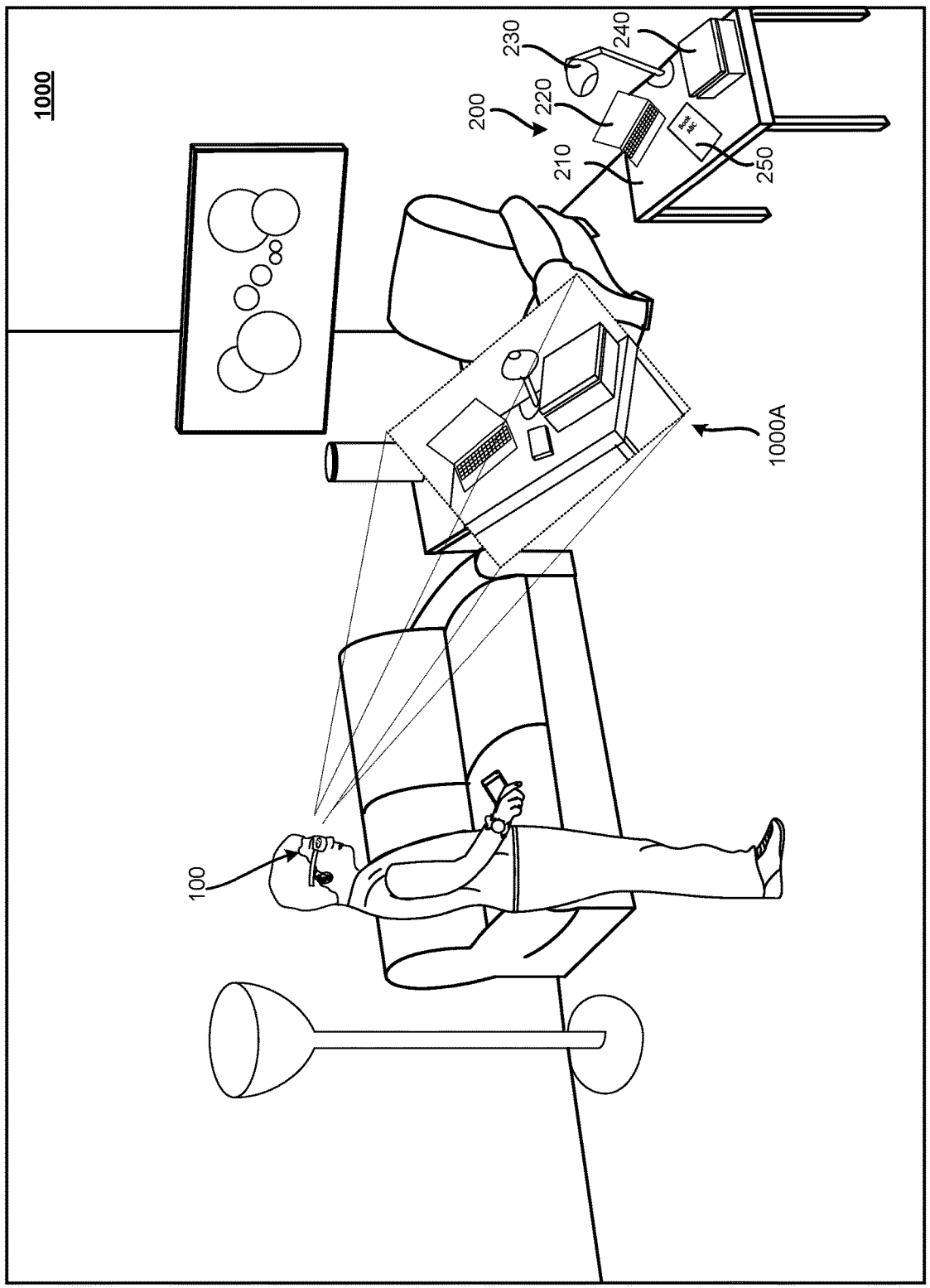

FIGS. 2A and 2B are third person views of the user in the ambient environment 1000. As illustrated in the example shown in FIGS. 2A and 2B, in some implementations, the user may view objects in the ambient environment 1000 through the wearable computing device 100. The ambient environment 1000 may be viewable by the user with and without wearing the wearable computing device 100. In some implementations, portions of the ambient environment 1000 captured within the field of view of the camera 116/objects within the captured portion of the ambient environment 1000 may be displayed to the user by the display device 104. In the example shown in FIG. 2A, a portion of the ambient environment 1000 including a workspace 200 is captured within the field of view, or live viewfinder, of the camera 116 of the wearable computing device 100. The example workspace 200 in the ambient environment 1000 includes a laptop computer 220, a lamp 230, a printer 240 and a book 250 on a desk 210. As shown in FIG. 2B, the display device 104 may display an image 1000A, or a capture area 1000A, to the user. The display of the image 1000A, or capture area 1000A may appear to be some set distance from the user, outside of the wearable computing device 100. The display of the image 1000A, or capture area 1000A, may depict content captured within the live viewfinder, or within the field of view of the camera 116 of the wearable computing device 100. The content depicted within the image 1000A, or capture area 1000A may be representative of the corresponding portion of the ambient environment 1000. The content depicted within the image 1000A, or capture area 1000A displayed to the user may change as the user moves in the ambient environment 1000 and/or as the user changes head orientation (thus re-orienting the camera 116 of the wearable computing device 100), and the like. In some implementations, the content depicted within the image 1000A, or capture area 1000A may at some point become fixed, even in the event of movement of the wearable computing device 100, which would change the portion of the ambient environment 1000 captured within the field of view of the camera 116. In some implementations, the content depicted within the image 1000A, or capture area 1000A may be fixed, for example in response to a user input or other detected condition, even as the user changes position in the ambient environment 1000 and/or head orientation. In some implementations, the fixing of the image 1000A, or capture area 1000A displayed by the display device 104 may facilitate user interaction with the displayed content, without the need to remain still (e.g., maintain a stationary position) to focus on a particular object included in the image 1000A, or capture area 1000A.

Figure 2C:
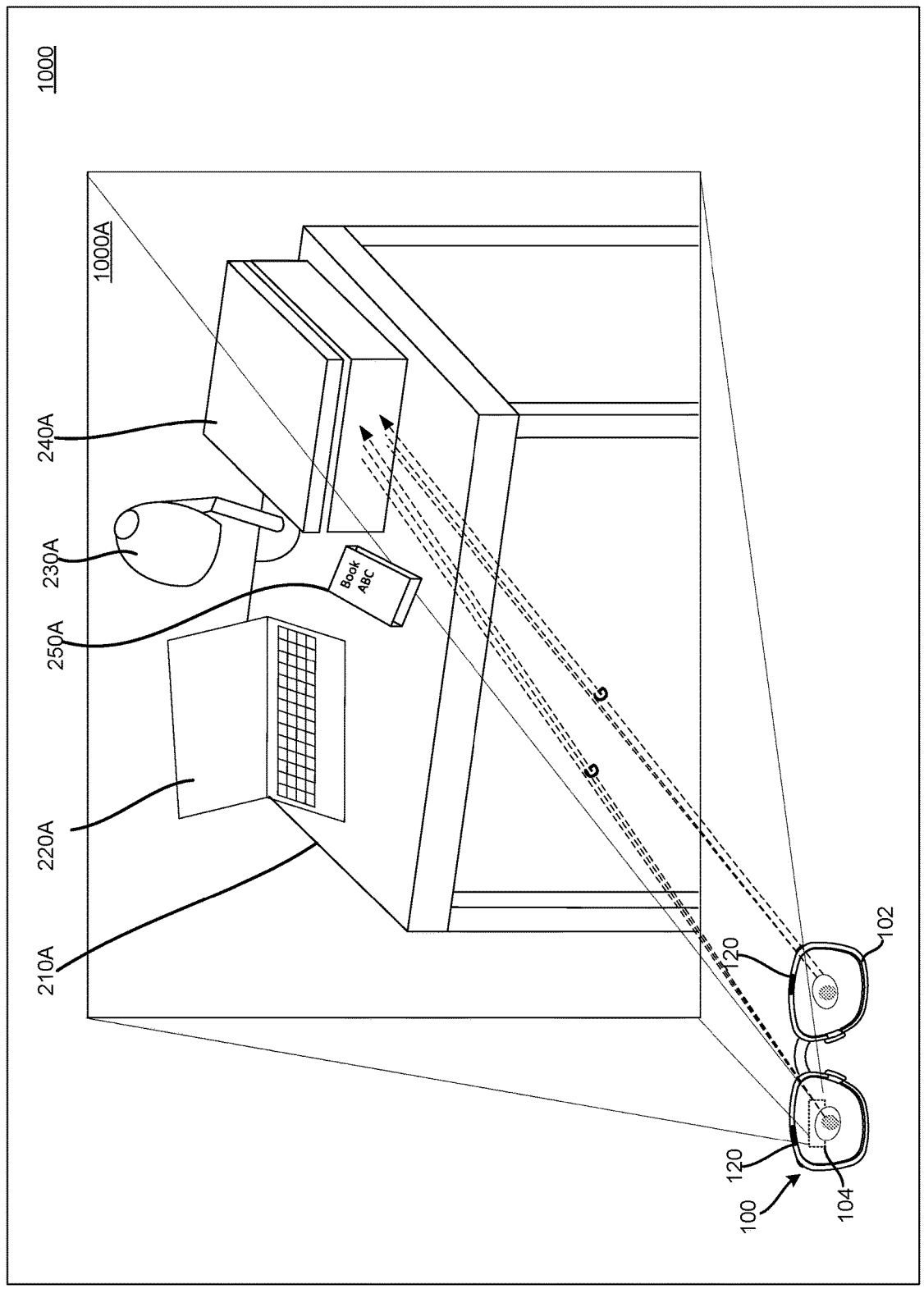
Figure 2D:
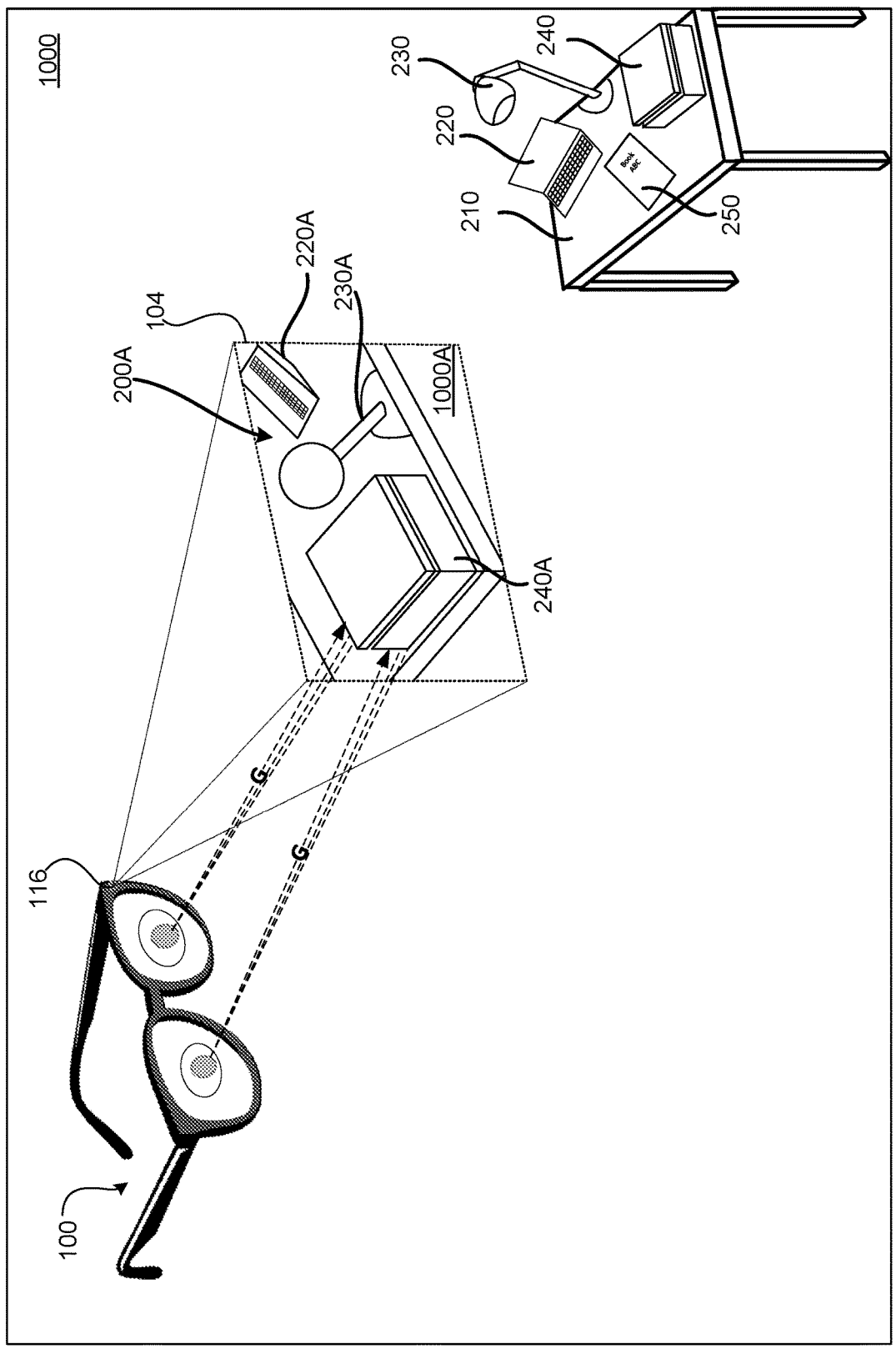

In the example shown in FIGS. 2B, 2C and 2D, the image 1000A, or capture area 1000A depicts a representation 220A of the laptop computer 220, a representation 230A of the lamp 230, a representation 240A of the printer 240 and a representation 250A of the book 250 on a representation 210A of the desk 210, corresponding to the laptop computer 220, the lamp 230, the printer 240 and the book 250 on the desk 210 in the workspace 200 in the ambient environment 1000. FIGS. 2C and 2D illustrate a user gaze G directed at an object in the workspace 200. In particular, in the examples shown in FIGS. 2C and 2D, the user gaze G is directed at the representation of the real world object included in the image 1000A, or capture area 1000A displayed to the user by the display device 104 of the wearable computing device 100. FIG. 2C is a third person view illustrating the image 1000A, or capture area 1000A as viewed by the user wearing the wearable computing device 100. FIG. 2D is a third person view of the image 1000A, or capture area 1000A as viewed from a position facing the user.

As shown in FIGS. 2C and 2D, a gaze G, for example, an eye gaze G of the user may be detected by the gaze tracking device 120. In some implementations, the wearable computing device 100 includes a single gaze tracking device 120 including one or more sensors 125 such as, for example, image sensors and/or other types of sensors configured to collect data for eye gaze tracking. In some implementations, the single gaze tracking device 120 tracks eye gaze, for example, tracks pupil movement, for one eye of the user. In some implementations, the single gaze tracking device 120 tracks eye gaze, for example, pupil movement, for both eyes of the user. In some implementations, the wearable computing device 100 includes multiple gaze tracking devices 120 such as, for example, a first gaze tracking device 120 including one or more image sensors 125 to track movement, for example pupil movement, of a first eye of the user, and a second gaze tracking device 120 including one or more image sensors 125 to track movement, for example pupil movement, of a second eye of the user.

In the example shown in FIGS. 2C and 2D, the detected gaze G is scanning the representation 200A of the workspace 200 in the image 1000A, or capture area 1000A representative of the portion of the ambient environment 1000 captured within the live viewfinder, or field of view of the camera 116 of the wearable computing device 100. In some implementations, the system may operate to track user gaze, to detect fixation of the gaze on an object, and to perform an operation to identify the object on which the gaze G is focused.

In some implementations, the wearable computing device 100 may operate in a select mode, in which the wearable computing device 100 operates to detect user focus on an object for selection. In some implementations, operation of the wearable computing device 100 in the select mode may be triggered in response to a detected condition for entering the select mode. For example, operation of the wearable computing device 100 in the select mode may be triggered in response to detected movement of the wearable computing device 100 within a previously set range, indicative that the user has essentially stopped moving. In some implementations, movement of the wearable computing device 100 may be detected by, for example, one or more sensing devices of the wearable computing device 100, such as, for example, an inertial measurement unit of the wearable computing device 100 and the like. In some implementations, operation of the wearable computing device 100 in the select mode may be triggered in response to a user input. In some examples, the user input may include, for example, an audible command detected by the wearable computing device 100 and/or an external device paired with the wearable computing device 100. In some examples, the user input may include a touch input or a gesture input detected by the wearable computing device 100 and/or an external device paired with the wearable computing device 100. In some examples, other inputs detected at the wearable computing device 100 and/or an external device paired with the wearable computing device 100 may trigger operation of the wearable computing device 100 in the select mode.

In some implementations, operation in the select mode may cause the wearable computing device 100 to initiate operation of the gaze tracking device(s) 120. In some implementations, operation in the select mode may cause the wearable computing device 100, for example, a processor of the wearable computing device 100, to initiate an operation in which eye gaze data collected by the gaze tracking device(s) 120 may be analyzed to identify an object of focus based on the detected eye gaze data. In some implementations, the eye gaze may be directed at, or focused on a portion of the image 1000A or capture area 1000A captured by the camera 116 and viewable by the user on the display device 104 of the wearable computing device 100. The eye gaze data may be analyzed to match the detected gaze to a pixel area 290A, or to a pixel 290A, of the image 1000A. Isolation, or matching of the detected gaze to a particular pixel are 290A, or to a particular pixel 290A, of the displayed image 1000A, or capture area 1000A may facilitate identification of the object of focus of the detected gaze, and may facilitate user selection and interaction with the object of focus.

Figure 2E:
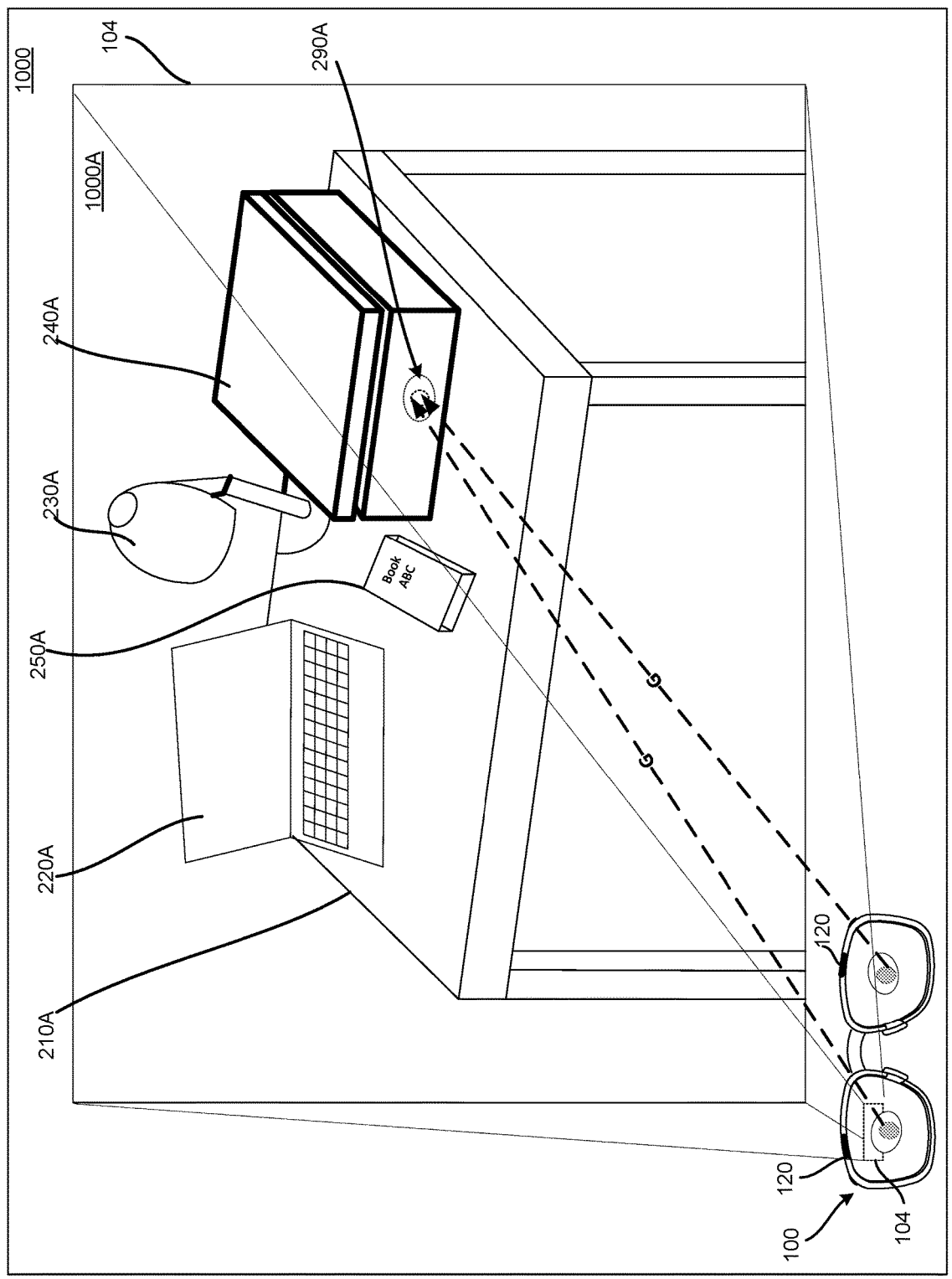

A live image feed of objects in the ambient environment 1000 captured within the field of view of the camera 116 may be displayed to the user by the display device 104. As the user moves in the ambient environment 1000, as the head of the user shifts or changes position and/or orientation, and the like, live content displayed in the image 1000A, or capture area 1000A may change as the objects in the ambient environment 1000 captured within the field of view of the camera 116 change. As the object in the ambient environment 1000 that is of interest to the user is captured within the field of view of the camera 116 and displayed to the user in the image 1000A, or capture area 1000A by the display device 104, the user gaze G may begin to settle on the object of interest in the image 1000A, or capture area 1000A, as shown in FIG. 2E.

In some situations, the field of view of the camera 116 may be offset from the field of view of the user. In this example, the field of view of the user as viewed through the lenses of the wearable computing device 100 is offset from the field of view of the camera 116). In this example arrangement, the view captured by the camera 116 is different than the user view of the ambient environment 1000 through the lenses of the wearable computing device 100. For example, in an arrangement in which the camera 116 is oriented essentially straight out from the wearable computing device 100/the head of the user, and the display device 104 is oriented so as to be offset by some angular distance from a nominal gaze of the user, the ambient environment 1000 visible through the lenses of the wearable computing device 100 and the content captured by the camera 116 and depicted in the image 1000A, or capture area 1000A by the display device 104 would not match. In some situations, this may allow the user to clearly separate the content provided by the display device 104 from the user view of the ambient environment 1000 through the wearable computing device 100, and thus may facilitate user interaction. In some situations, the display device 104 may be essentially aligned with the nominal gaze of the user. In this example, the image 1000A, or capture area 1000A displayed by the display device 104 may essentially coincide with, or match, the ambient environment 1000 as viewed by the user, specifically at some fixed point in the ambient environment 1000.

User movement or positioning outside of, or away from that fixed point may produce misalignment between the image 1000A, or capture area and the user view of the ambient environment 1000 through the lenses of the wearable computing device 100. In some situations, this deterioration in the alignment or match between the image 1000A, or capture area 1000A and the user view of the ambient environment 1000 may cause the user to move to align, or re-align the image 1000A, or capture area 1000A with the user view of the ambient environment 1000. In some implementations, the system may prompt the user to move the image 1000A, or capture area 1000A into alignment with the user view of the ambient environment 1000. In some situations, this may allow the user to more clearly discern object(s) of interest, may facilitate selection and interaction, and the like. In some implementations, this may facilitate system calibration. In some implementations, given the calibration and the location of the fixed point at which the displayed image 1000A, or capture area 11000A is aligned with the user view of the ambient environment 1000, the system can then verify (based on data collected by the gaze tracking device(s) 120) that the user is looking at the displayed image 1000A, or capture area from the fixed point, and calculate a vergence to an object within the displayed image 1000A, or capture area 1000A to estimate a corresponding distance. In a situation in which the user aligns the displayed image 1000A, or capture area 1000A with the user view of the ambient environment 1000 (for example, in response to a system prompt to carry out the alignment), the system may detect alignment based on relative lack of movement, fixation of the user gaze, and the like. In response to the detected alignment, the pixel area 290A, or pixel 290A of the display of the image 1000A, or capture area 1000A associated with the detected gaze produces a first ray extending from the camera 116 through an imaging plane of the camera 116 directed to a point corresponding to the pixel 290A, and a second ray extending from the eye of the through the pixel 290A of the display of the image 1000A, or capture area 1000A displayed by the display device 104. Factory calibration of components of the gaze tracking device(s) 120, positioning of the display device 104, and positioning of the camera 116 allow for the first and second rays to be referenced to a common coordinate system for example, the coordinate system associated with the camera 116) and for the angle between the first and second rays to be computed. A known position of the eye of the user by the gaze tracking device(s) 120 and a transform from the field of view of the gaze tracking device 120 to the field of view of the camera 116 allows the angle and the distance from the camera 116 to the eye of the user to be computed, yielding one side and two angles of a triangle formed by the camera 116, the eye of the user, and the object of interest. Casting rays along these two angles to their intersection may provide an estimate of distance In some implementations, the gaze tracking device(s) 120 may continue to track the eye gaze of the user as the user views and scans the image 1000A, or capture area 1000A for the representation of the object of interest. As the user scans the image 1000A, or capture area 1000A, the gaze tracking device(s) 120 may detect corresponding smooth pursuit, or smooth eye gaze motion. As the user locates the object of interest within the image 1000A, or capture area 1000A, eye motion may begin to settle (for example, at or near the object of interest), and the gaze tracking device(s) 120 may begin to detect fixation of the gaze, in which the gaze may transition from the smooth pursuit motion (during scanning) to a relatively fixed condition, or a fixation gaze. In the fixation gaze, the user gaze may be focused on the representation of the object of interest depicted in the image 1000A, or capture area 1000A provided by the display device 104. In some implementations, the fixation gaze may be detected based on detected eye gaze movement of less than or equal to a previously set threshold amount of movement. In some implementations, the set threshold amount of movement may include a magnitude and/or a frequency and/or a rate of movement. In some implementations, fixation gaze may be characterized by detection of involuntary microsaccadic eye movement centered around a target, Fixation may be characterized by less than approximately 1 degree of gaze angle at a frequency of approximately 1 to 2 Hertz, or a speed of less than approximately 100 degrees per second. In contrast, smooth pursuit eye gaze, or free motion eye gaze, may be characterized by saccades of greater than approximately 1 degree and/or frequencies above approximately 2 Hertz.

In response to detection of gaze fixation, the system may correlate or match the detected fixation gaze to a corresponding portion of the image 1000A, or capture area 1000A, for example a particular pixel area, or pixel. For example, the system may match an intersection of the detected fixation gaze with a corresponding portion, or pixel area, or pixel, of the image 1000A, or capture area 1000A provided by the display device 104. In some implementations, the system matches the detected fixation gaze with the pixel area, or pixel, based on a known relationship between the world facing camera 116, the corresponding content depicted in the image 1000A, or capture area 1000A, and the orientation of the gaze tracking device(s) 120.

Based on, for example, the known orientation of the world facing camera 116, the display device 104, and the gaze tracking device(s) 120 tracking eye gaze, the pixel area 290A, or pixel 290A associated with the detected fixation of the gaze G, the system may initiate a process to identify the object of interest associated with the fixation of the user's gaze G. In some implementations, the identification of the object corresponding to the identified pixel area 290A, or pixel 290A may include an image search based on features that are recognized or detected in a portion of the image 1000A, or capture area 1000A surrounding the identified pixel area 290A, or pixel 290A. In some implementations, features recognized or detected in the portion of the image 1000A, or capture area 1000A may be matched to known objects in the ambient environment 1000 to identify the object associated with the fixation gaze. In some implementations, the system may access an external source, such as an external database, to search for and recognize or identify the object associated with the fixation gaze.

Matching of the detected fixation gaze G to the pixel 290A, or pixel area 290A will now be described. In some implementations, light may be generated by the display device 104 and directed toward the eye(s) of the user wearing the wearable computing device 100. Reflections of this light off the cornea may produce vectors normal to the center of the cornea, detectable by the gaze tracking device(s) 120, with two such normal vectors intersecting at an estimated 3D center of the cornea. The pupil may be located and a calibrated or estimated cornea radius may be used to form a sphere based on the estimated 3D center of the cornea. The index of refraction of the cornea and aqueous humor at a known depth of the surface of the cornea to a plane of the pupil may provide a 3D location of the pupil. A ray from the 3D center of the cornea center through the 3D center of the pupil may define the optical axis of the eye. This may then be adjusted for a calibrated visual axis offset for the user. The visual axis offset may extend toward the nose, for example, less than approximately 5 degrees towards the nose. The intersection of that ray and the image 1000A, or capture area 1000A provided by the display device 104 may represent a single pixel 290A at which the detected gaze is directed. Multiple such observations may define a pixel area 290A. The detection of the intersection of the ray with the image 1000A, or capture area 1000A may be facilitated by calibration of the position of the display device 104 with respect to the camera 116.

In some implementations, a best-fit 2D ellipse for the pupil may be used to compute horizontal and vertical rotations that would translate as a circular projection on the data, for example, image data of the pupil captured by the gaze tracking device(s) 120. The horizontal and vertical rotations may form the basis for an estimate of an inverse of an angle of the gaze.

In some implementations, the data collected by the gaze tracking device(s) such as, for example, image data, may be fed into neural networks, employ numerous deep layers, and regress to X and Y coordinates associated with the detected gaze. These X and Y coordinates may then be used to determine the intersection of the detected gaze with the display of the image 1000A, or capture area 1000A by the display device 104.

Identification of the pixel 290A, or the pixel area 290A, of interest may provide for the eventual identification of an object of interest. For example, edge detection may be used to segment the area surrounding the pixel 290A, or pixel area 290A, of interest from surrounding areas in the image 1000A, or capture area 1000A, to define an image patch. The image patch may be processed, for example, by an external resource or by the wearable computing device 100, to assign one or more semantic labels identifying the object depicted in the image patch.

In some implementations, identification of the object depicted in the image patch may include supplemental information related to the identified object of interest. In some implementations, the object of interest may be known to correspond to a particular system action or function which may be implemented in response to identification of the object of interest. In some implementations, in which the object of interest includes a visual code, such as, for example a quick response (QR) code, specialized action or functionality or information may be returned in response to the identification of the visual code in the image patch.

Identification of the pixel 290A, or pixel area 290A of the image 1000A, or capture area 1000A may be translated into a ray that extends outward from the camera 116 into the ambient environment 1000. Segmentation of the area surrounding the pixel 290A, or pixel area 290A, may provide a boundary which may at least in part define an angular distance from top to bottom, left to right associated with the segmented area. In some implementations, an estimate of the size of the object of interest (based on the angular size and the distance to the object) or the distance to the object of interest (based on the angular size and known dimensions of the object of interest) may facilitate identification of the object of interest. In some implementations, identification of objects in proximity to the object of interest may also facilitate the determination of scale and distance associated with the object of interest.

In some implementations, the system may interpret the detected fixation of the gaze G on the representation 240A of the printer 240 as a user input, for example, a user input selecting the printer 240. In a wearable computing device 100 configured for operation in the select mode as described above, the system may interpret the detected fixation of the gaze G on the representation 240A of the printer 240 as a user input selecting the printer 240 when the wearable computing device 100 is operating in the select mode. In some implementations, in response to a detected selection of an object such as the detected selection of the printer 240 as described above, user interaction with the selected object may be enabled.

In some implementations, once operating in the select mode, content of the image 1000A, or capture area 1000A may remain static, or fixed, so that the objects depicted in the image 1000A, or capture area 1000A remain displayed by the display device 104 regardless of subsequent user movement, changes in orientation of the world facing camera 116, changes in objects within the field of view of the world facing camera 116 and the like. This may allow a user to initiate and/or complete an interaction with the selected object, with that object still displayed to the user by the display device 104. This may improve user interaction with the object and avoid discomfort and distraction during user interaction with the object.

In some implementations, operation in the select mode, control of the content depicted in the image 1000A, or capture area 1000A during operation in the select mode, release of operation in the select mode and the like may be set in accordance with user preferences.

In some implementations, an indication of the detected selection may be implemented prior to providing for user interaction with the selected object. For example, in response to detected selection, an appearance of the representation of the selected object as depicted in the image 1000A, or capture area 1000A may be altered to reflect the detected selection. For example, the representation of the object may be highlighted or bolded, as the representation 240A of the printer 240 shown in FIG. 2E, to indicate selection of the printer 240 based on the detected fixation gaze. In some implementations, a verification of the detected selection may be implemented prior to providing for user interaction with the selected object. For example, a fixation gaze that is sustained for greater than a previously set threshold amount of time, a user input or gesture including, for example an eye gesture such as a blink, and the like may provide verification of the selection. In some implementations, a user input such as a touch input, an audible input and the like received by the wearable computing device 100 may provide verification of the selection. In some implementations, a user input providing verification of the selection may be received at an eternal device that is in communication with the wearable computing device 100. In some implementations, a user input such as a head and/or eye gaze movement away from the representation of the selected object, an input detected at the wearable computing device 100, an input received via an external device in communication with the wearable computing device 100, or other such user input may release selection of the object.

Figure 2F:
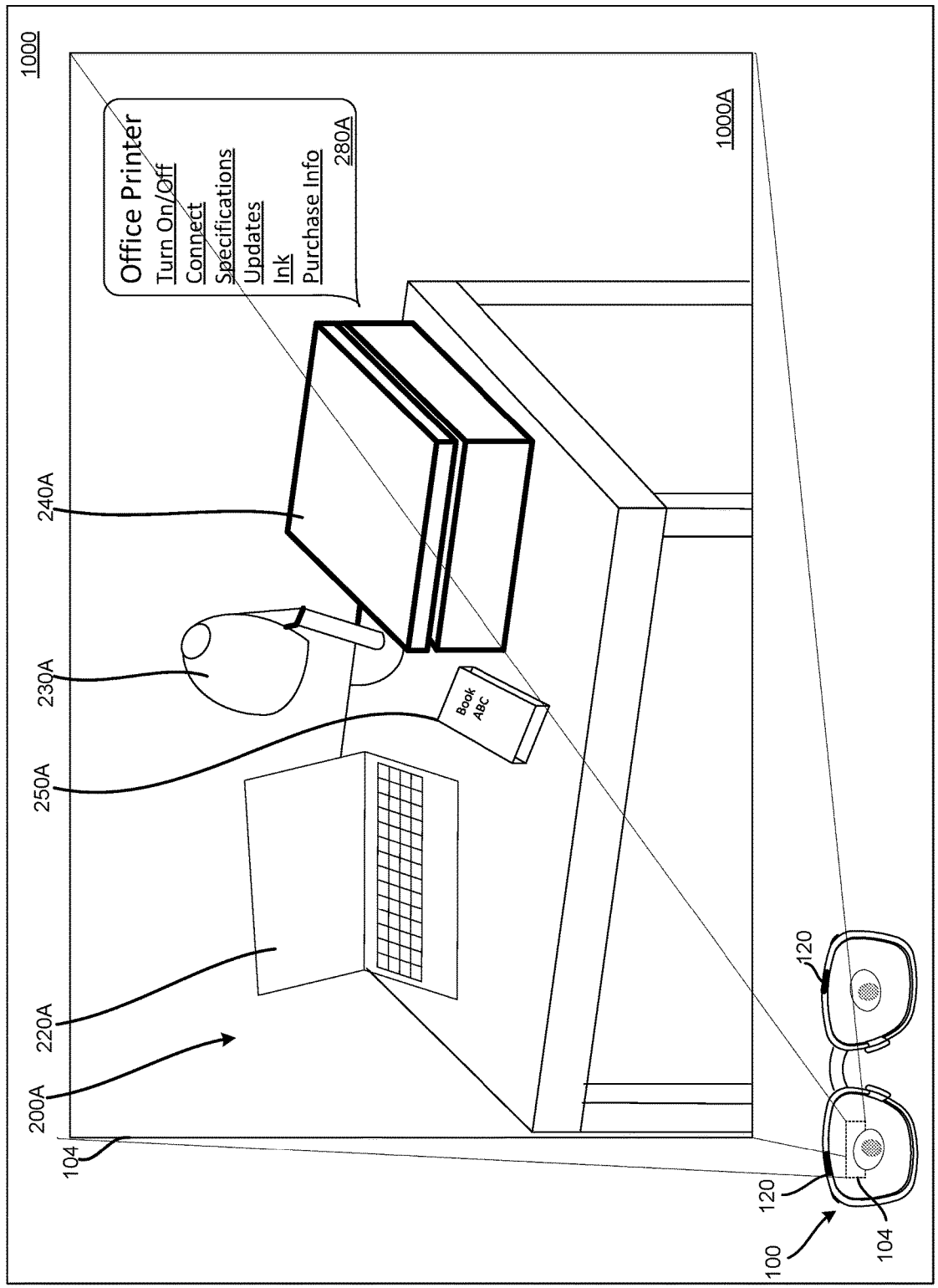

As noted above, in response to a detected selection of an object such as the detected selection of the printer 240 as described above (and in some implementations, in response to user verification of selection of the object), user interaction with the selected object may be enabled. For example, in response to detected selection of the printer 240 as described above, the user may be provided with access to additional information related to the printer 240, access to control of the printer, and the like. In some implementations, access to additional information and control related to the selected object (the printer 240 in this example) may be provided in the form of a menu 280A displayed to the user by the display device 104 of the wearable computing device 100, as shown in FIG. 2F. In the example shown in FIG. 2F, the example menu 280A includes various items that may be selected by the user to access and control functionality of the printer 240, to access additional information related to the printer 240 and the like. In some implementations, selection of one of the items from the menu 280A may be triggered in response to a user input. User inputs may include, for example, a gaze input as described above, a voice input, a gesture input, a touch input at the wearable computing device 100 and/or an external device in communication with the wearable computing device 100, and the like.

Figure 2G:
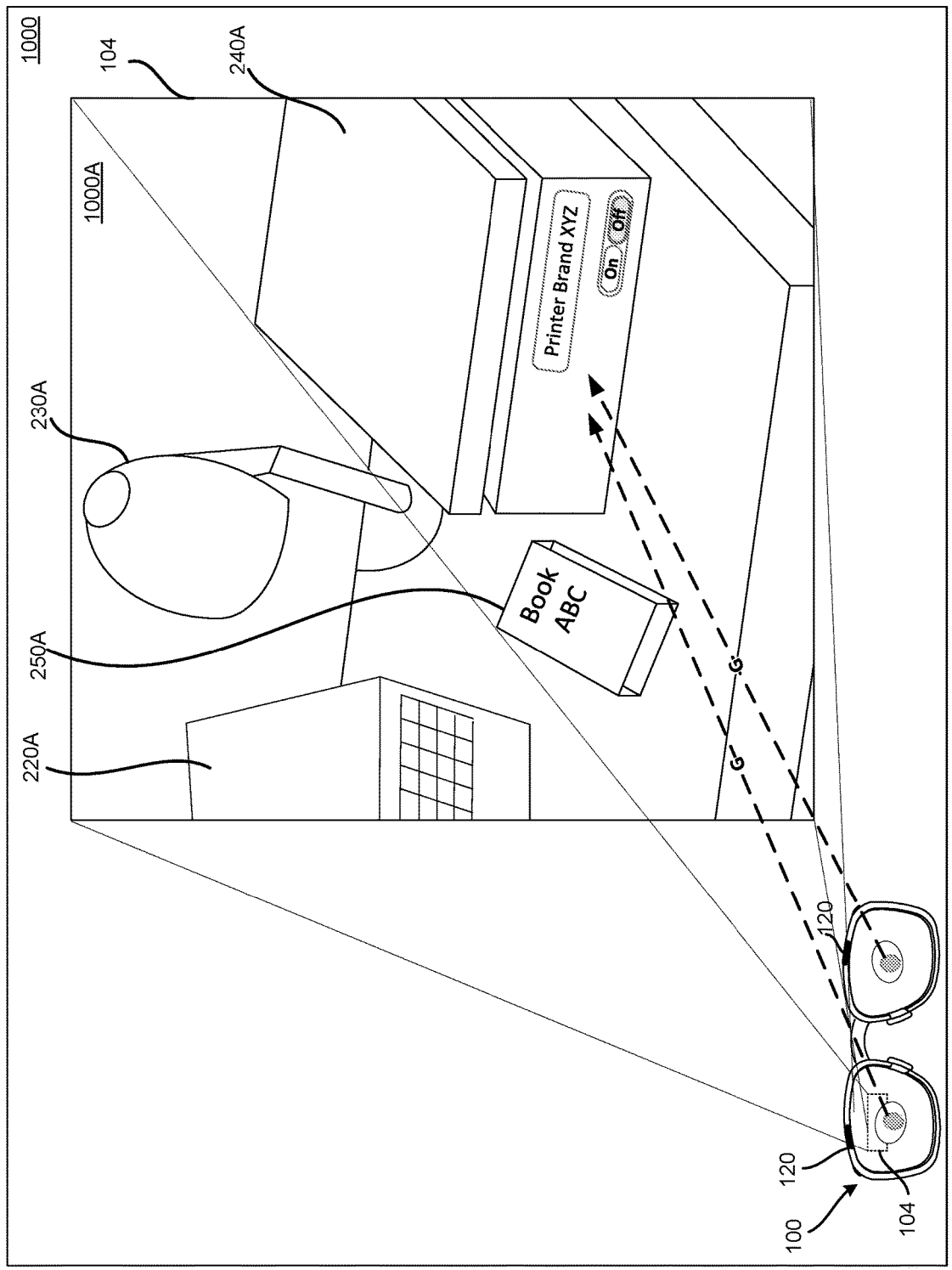

In some implementations, in response to the detection of the fixation of the user gaze G as described above with respect to FIG. 2E, a zooming action may be implemented, as shown in FIG. 2G. The zooming action may allow the user to view a zoomed-in version of the image 1000A, or capture area 1000A including the portion of the image 1000A or capture area 1000A on which the user's gaze G is fixed or focused. This zooming action may allow the user to further focus, or more precisely focus his or her gaze at a desired object, and/or may allow the user to gain additional information not visible without the zooming action. For example, a brand and an operating status of the printer 240 (based on the representation 240A of the printer 240 visible to the user in the image 1000A, or capture area 1000A), which were not visible to the user in FIGS. 2E and 2F, are visible to the user in the zoomed-in view shown in FIG. 2G. Thus, the zooming action may provide the user with additional information related to the object of focus, and may obviate or eliminate the need for the system to identify the object and/or to obtain additional information related to the object. In some implementations, the zooming action may allow the user to further discriminate the area of focus on the image 1000A, or capture area 1000A, to more accurately fix the gaze in the desired area/on the desired object/portion of the object.

Figure 2H:
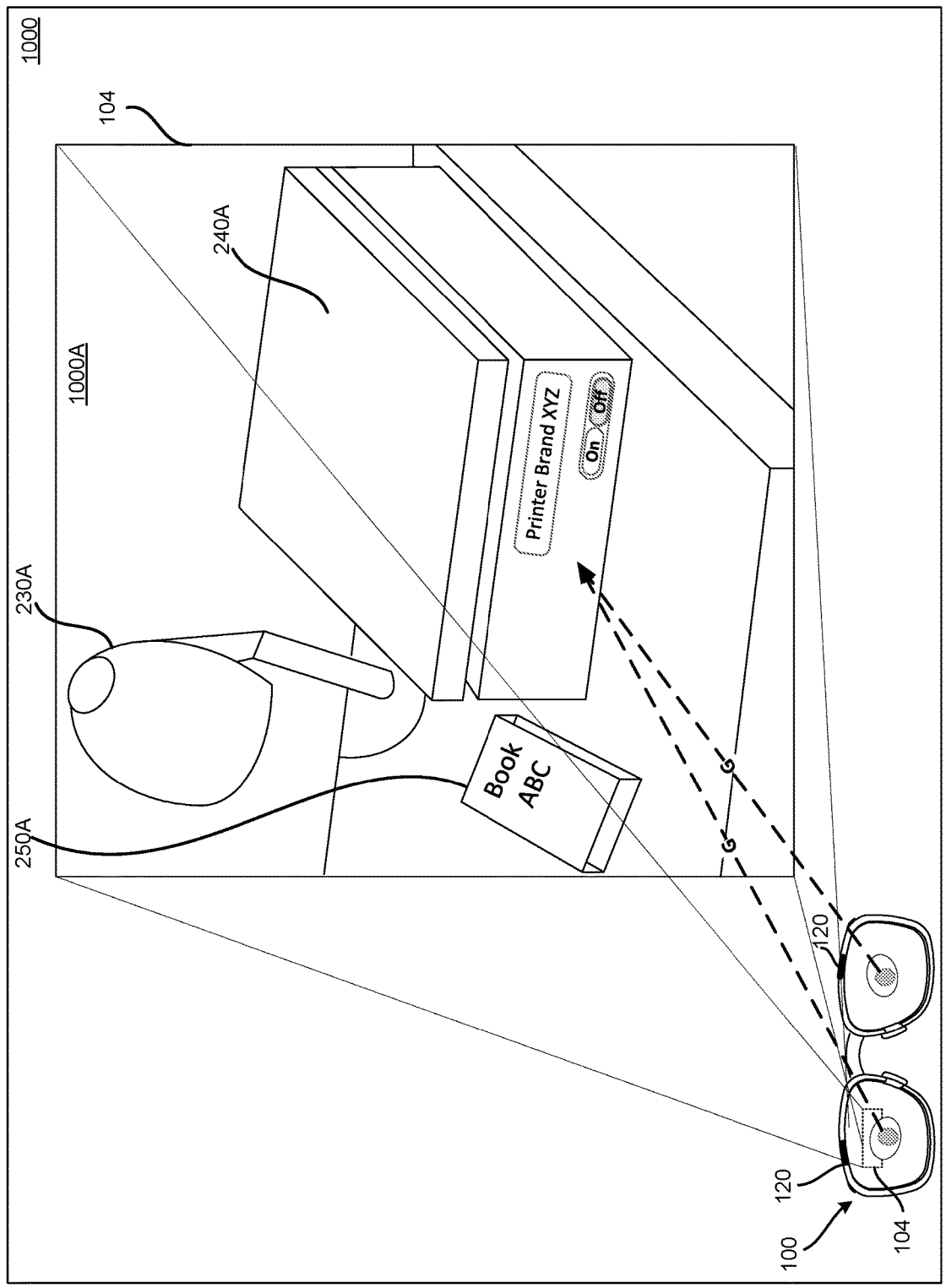

In some implementations, the ability to zoom in this manner may allow a gaze tracking device having relatively lower accuracy to still facilitate the identification of an object of interest in this manner. For example, by zooming in on the image 1000A, or capture area 1000A (corresponding to that portion of the ambient environment 1000), the object of interest may fill a relatively large portion, or substantially all of a quadrant area, thus allowing a relatively low resolution/low fidelity gaze tracking device to disambiguate the object of interest. In some implementations, zooming may be done in response to a user input at the wearable computing device 100 and/or at an external computing device that is paired to the wearable computing device 100, including for example, touch inputs, audible inputs and the like. In some implementations, the system may perform a panning action so that the fixation gaze, or a fixated area of interest is at a central portion of the displayed image 1000A, or capture area 1000A to facilitate localized zooming and retain context. For example, if the user fixation gaze is directed to the lower right corner of the displayed image 1000A, or capture area 1000A, the system may correlate the detected fixation gaze with an area of interest at the lower right corner of the displayed image 1000A, or capture area 1000A, and perform the panning action so that the area of user interest is centered on the display of the image 1000A, or capture area 1000A, as shown in FIG. 2H. In some implementations, the panning action may be performed at a rate such that the user can visually follow and maintain the gaze on the object of interest.

As noted above, in a system and method in accordance with implementations described herein, user gaze may be tracked to detect a fixation gaze relative to an image, or a capture area depicting content captured within a field of view of a world facing camera of a wearable computing device. A fixation point of the fixation gaze may be correlated to a pixel area, or a pixel of the image, or capture area. The pixel area, or pixel corresponding to the fixation point may in turn be used to identify the object of focus of the fixation gaze.

In detecting the fixation gaze, the gaze tracking device(s) may track eye movement, including natural, unaffected eye movement and deliberate eye movement, substantially continuously. Continued sampling of eye gaze direction may generate an eye gaze pattern, and may allow the system to estimate a center of the eye gaze pattern as the pattern closes in on a particular pixel in the image, or capture area captured by the world facing camera and displayed by the display device. This analysis may isolate a pixel area, or a pixel of the image captured by the world facing camera at which the user's eye gaze is fixated. Correlation of the tracked eye gaze direction and/or fixation gaze with the image, or capture area depicting objects in the field of view of the world facing camera of the wearable device may allow the system to determine an object of focus, regardless of a position of the wearable device on the head of the user. This may eliminate complexities and error generated due to differences in fit for different users of the wearable device, movement or slippage of the wearable device and the like. This may also eliminate the need to account for depth which is typically encountered when correlating eye tracking directly to a real world view of the ambient environment, rather than to the image, or capture area provided by the display device. The substantially fixed relationship (for example, on the frame of the wearable computing device) of the world facing camera, the gaze tracking device(s), and the display device, may eliminate the need for depth data, and may eliminate numerous variables due to fit, orientation, user habits and the like, which otherwise add cost, complexity and error into the determination of an object of focus of the user gaze. Calibration of the world facing camera with the display device to establish a known relationship between the capture area per pixel of the camera and the optical axis associated with the display device may further facilitate the accurate correlation of a detected fixation gaze with a particular pixel area, or pixel.

Figure 3:
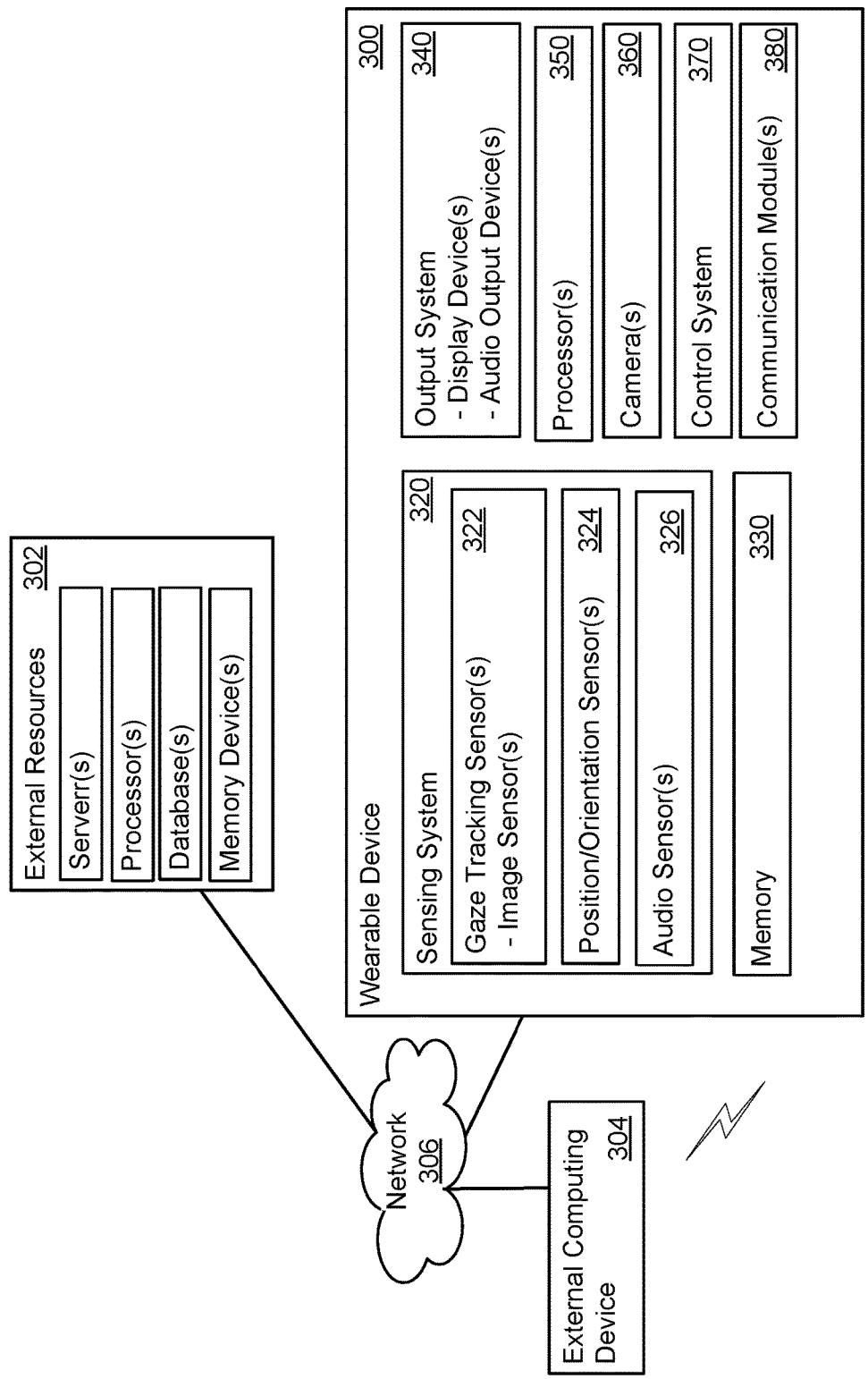
FIG. 3 is a block diagram of a system for object selection using a wearable device, according to implementations described throughout this disclosure.

FIG. 3 is a block diagram of an example system, according to implementations described throughout this disclosure. As shown in FIG. 3, in some implementations, the system includes one or more computing devices including at least one wearable computing device 300 (such as, for example, the wearable computing devices 100A-100D described above, and/or other wearable computing devices). The wearable computing device 300 can communicate selectively via a network 306 to access external resources 302 such as, for example, server computer systems, processors, databases, memory storage, and the like. The wearable computing device 300 can operate under the control of a control system 370. The at least one wearable computing device 300 can communicate with an external computing device 304 (another wearable computing device, another mobile computing device and the like) either directly (via wired and/or wireless communication), or via the network 306. In some implementations, the wearable computing device 300 includes a communication module 380 to facilitate external communication. In some implementations, the wearable computing device 300 includes a sensing system 320 including various sensing system components including, for example one or more gaze tracking sensors 322 including, for example image sensors, one or more position/orientation sensor(s) 324 including for example, an inertial measurement unit, accelerometer, gyroscope, magnetometer and the like, and one or more audio sensors 326 that can detect audio input. The wearable computing device 300 can include more, or fewer, sensing devices and/or combinations of sensing devices.

In some implementations, the wearable computing device 300 may include an output system 340 including, for example, one or more display devices that can display still and/or moving image content and one or more audio output devices that can output audio content. In some implementations, the wearable computing device 300 may include one or more camera(s) 360. The camera(s) 360 may be, for example, outward facing, or world facing cameras that can capture still and/or moving images of an environment outside of the wearable computing device 300. The still and/or moving images may be displayed by the display device of the output system 340 and/or transmitted externally via the communication module 380 and the network 306, and/or stored in a memory 330 of the wearable computing device 300. The wearable computing device 300 may include one or more processors 350, which may be formed in a substrate configured to execute one or more machine executable instructions or pieces of software, firmware, or a combination thereof. The processor(s) 350 can be semiconductor-based that include semiconductor material that can perform digital logic. The memory 330 may include any type of storage device that stores information in a format that can be read and/or executed by the processor(s) 350. The memory 330 may store applications and modules that, when executed by the processor(s) 350, perform certain operations. In some examples, the applications and modules may be stored in an external storage device and loaded into the memory 330.

Although FIG. 3 illustrates a single wearable computing device 300, the implementations described herein may encompass any number of such systems (e.g., more than two). Similarly, the devices depicted in FIGS. 1A-1C and 2A-2G may include (or have access to) any or all of the elements of the system shown in FIG. 3.

FIG. 4 is a flowchart of an example process 400 to identify an object for selection based on a detected fixation gaze directed to a display of a wearable computing device, and correlation of the detected fixation gaze to an object for interaction, in accordance with implementations described herein. In general, process 400 utilizes the systems and algorithms described herein to enable a wearable computing device, such as the wearable computing devices described herein, to identify an object for selection by a user based on a detected fixation gaze on an image of an environment outside of the wearable computing device. The process 400 may utilize a computing system with at least one processing device and memory storing instructions that when executed cause the processing device to perform the plurality of operations and computer implemented steps described in the claims.

The process 400 includes operating a wearable computing device including a world facing camera and a display device including a display that is visible to the user wearing the wearable computing device (block 410). The world facing camera can capture still and/or moving images of an environment outside of the wearable computing device, and the display device can display the images captured by the camera. In this example, the wearable computing device may be the wearable computing device 100 and/or the wearable computing device 300 described above with respect to FIGS. 1A through 3. In response to detection of operation in a select mode (block 430), one or more gaze tracking devices of the wearable computing device may be operated (block 440). In the select mode, the gaze tracking device(s) may operate to track eye gaze of the user relative to the images, displayed on the display device, of the ambient environment within the field of view of the camera. In the select mode, the gaze tracking device(s) may track eye gaze to detect gaze fixation relative to the image of the ambient environment displayed by the display device (block 450). Gaze fixation may be detected when, for example, detected eye gaze motion is fixated on a portion of the displayed image, and thus eye gaze motion is minimal, and/or is below a set threshold of movement. For example, gaze fixation may be detected when detected eye gaze movement is less than a set number of degrees from an optical axis. In response to detection of gaze fixation (block 450), a gaze fixation point may be mapped to a pixel area, or a pixel, of the image of the ambient environment displayed by the display device (block 460). The mapped pixel area, or pixel, may be used to identify an object that is the focus of the user gaze, and to set the identified object for selection (block 470).

Figure 5:
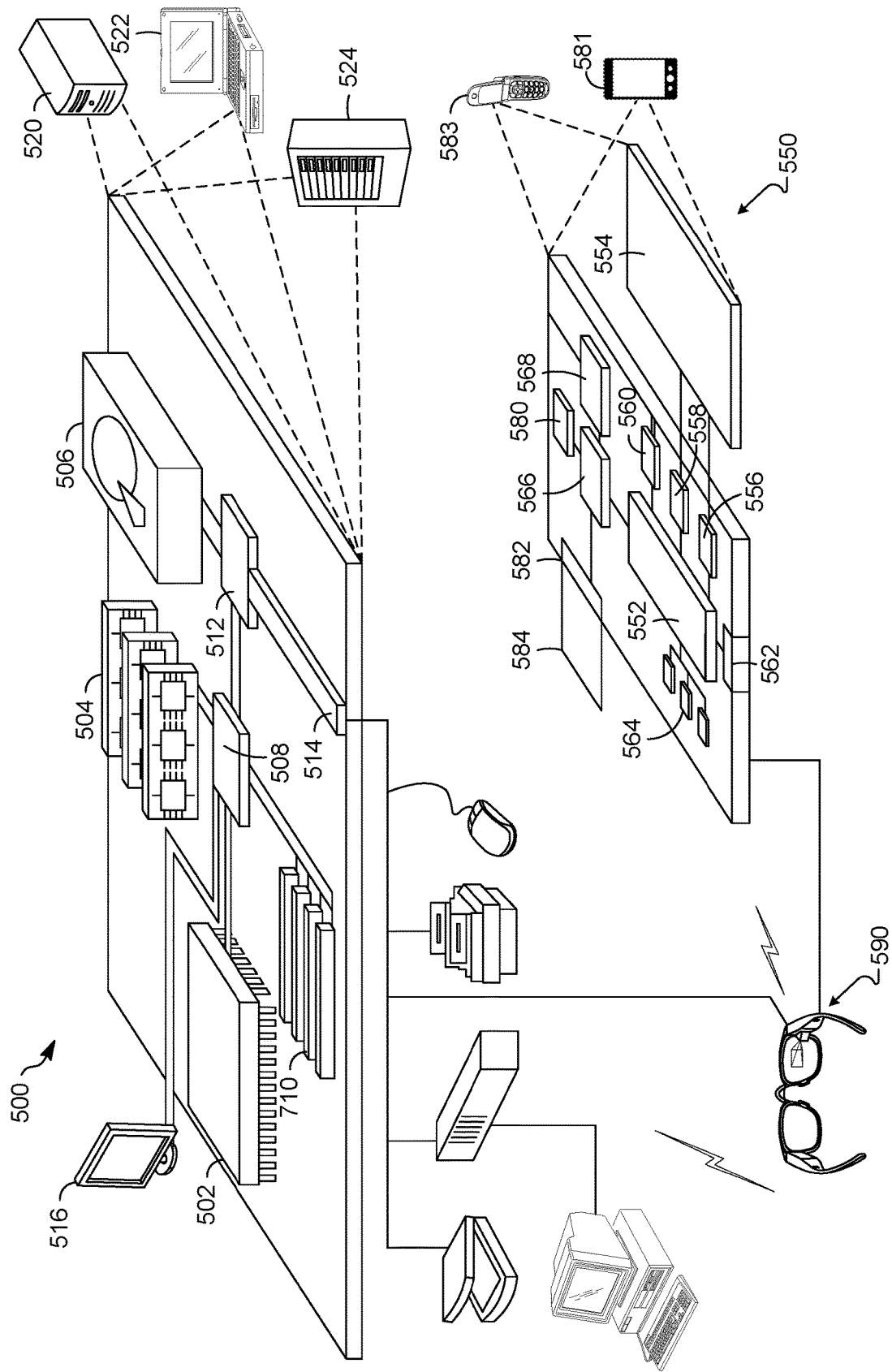
FIG. 5 shows an example of a computer device and a mobile computing device, which may be used with the techniques described herein.

FIG. 5 shows an example of a computer device 500 and a mobile computer device 550, which may be used with the techniques described here. Computing device 500 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. The processor 502 can be a semiconductor-based processor. The memory 504 can be a semiconductor-based memory. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk. In general, the computer-readable medium may be a non-transitory computer-readable medium.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 584 may also be provided and connected to device 550 through expansion interface 582, which may include, for example, a SIMM (Single In Line Memory Module) card interface. Such expansion memory 584 may provide extra storage space for device 550, or may also store applications or other information for device 550. Specifically, expansion memory 584 may include instructions to carry out or supplement the processes described above, and may include secure information also. Thus, for example, expansion memory 584 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 584, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, low power Bluetooth, Wi-Fi, or other such transceiver (not shown). In addition, GPS (Global Positioning System) receiver module 580 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 583. It may also be implemented as part of a smart phone 581, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 5 can include sensors that interface with an AR/VR headset (AR glasses/eyeglasses/VR headset/AR headset/HMD device 590). For example, one or more sensors included on computing device 550 or other computing device depicted in FIG. 5, can provide input to AR/VR headset 590 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 550 can use the sensors to determine an absolute position and/or a detected rotation of the computing device in the AR/VR space that can then be used as input to the AR/VR space. For example, computing device 550 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connected to, the computing device 550 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 550 when the computing device is incorporated into the AR/VR space can cause a particular action to occur in the AR/VR space.

In some embodiments, one or more output devices included on the computing device 550 can provide output and/or feedback to a user of the AR/VR headset 590 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 550 can be placed within AR/VR headset 590 to create an AR/VR system. AR/VR headset 590 can include one or more positioning elements that allow for the placement of computing device 550, such as smart phone 581, in the appropriate position within AR/VR headset 590. In such embodiments, the display of smart phone 581 can render stereoscopic images representing the AR/VR space or virtual environment.

In some embodiments, the computing device 550 may appear as another object in a computer-generated, 3D environment. Interactions by the user with the computing device 550 (e.g., rotating, shaking, touching a touchscreen, swiping a finger across a touch screen) can be interpreted as interactions with the object in the AR/VR space. As just one example, computing device can be a laser pointer. In such an example, computing device 550 appears as a virtual laser pointer in the computer-generated, 3D environment. As the user manipulates computing device 550, the user in the AR/VR space sees movement of the laser pointer. The user receives feedback from interactions with the computing device 550 in the AR/VR environment on the computing device 550 or on the AR/VR headset 590.

In some embodiments, a computing device 550 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method, comprising:
   capturing, by a camera mounted on a frame of a wearable computing device, images of an ambient environment outside of the wearable computing device;
   triggering display, by a display device mounted on the frame of the wearable computing device, of the images captured by the camera;
   tracking, by at least one gaze tracking device mounted on the frame of the wearable computing device, a user gaze directed at the images displayed by the display device of the wearable computing device; and
   identifying a pixel area, of a plurality of pixel areas of the images displayed by the display device, corresponding to the user gaze, including:
      detecting a fixation gaze directed at the images displayed by the display device, the fixation gaze being detected in response to movement of the user gaze having at least one of a magnitude or a frequency less than or equal to a set threshold; and
      matching the pixel area with a corresponding object in the ambient environment.

2. The computer-implemented method of claim 1, wherein the wearable computing device is a head mounted display device including the frame, with the camera, the display device and the at least one gaze tracking device all mounted to the frame, and the display device projecting the images of the ambient environment captured by the camera onto a lens of the head mounted display device.

3. The computer-implemented method of claim 1, wherein capturing images of the ambient environment includes capturing portions of the ambient environment within a field of view of the camera as the wearable computing device changes at least one of position or orientation in the ambient environment.

4. The computer-implemented method of claim 1, wherein tracking the user gaze includes tracking, by at least one eye gaze tracking device, eye gaze of at least one eye of a user of the wearable computing device.

5. The computer-implemented method of claim 1, wherein tracking user gaze directed at the display of the images and identifying the pixel area corresponding to the user gaze includes:
identifying a fixation point of the fixation gaze at an intersection of the fixation gaze with the display of the images; and
identifying the pixel area at the intersection of the fixation gaze with the display of the images.

6. The computer-implemented method of claim 5, wherein identifying the pixel area includes identifying a pixel within the display of the images at which the fixation gaze intersects the display of the images.

7. The computer-implemented method of claim 1, wherein matching the pixel area with the corresponding object in the ambient environment includes:
analyzing an area surrounding the pixel area;
identifying features within the area surrounding the pixel area based on the analyzing;
recognizing at least one of the features; and
matching the pixel area to the corresponding object based on the at least one of the features.

8. The computer-implemented method of claim 7, wherein recognizing the at least one of the features includes at least one of:
recognizing the at least one of the features based on a search of an external database of previously stored images; or
recognizing the at least one of the features based on known features of the ambient environment.

9. The computer-implemented method of claim 1, wherein the tracking of the user gaze, the identifying of the pixel area, and the matching of the pixel area to the corresponding object in the ambient environment includes:
initiating, by a processor of the wearable computing device, a select mode of operation of the wearable computing device in response to at least one of a detected user input or detection of a stationary condition of the wearable computing device for greater than or equal to a previously set threshold of time; and
performing the tracking, the identifying and the matching only during operation of the wearable computing device in the select mode.

10. A computing system, comprising:
a wearable computing device, including:
a frame;
a camera coupled to the frame so as to capture images of an ambient environment outside of the wearable computing device;
a display device coupled to the frame;
at least one gaze tracking device coupled to the frame;
at least one processing device; and
a memory storing instructions that, when executed cause the computing system to perform operations, including:
capturing, by the camera, images of the environment outside of the wearable computing device;
triggering display, by the display device, of the images captured by the camera;
tracking, by the at least one gaze tracking device, a user gaze of the wearable computing device directed at the display of the images by the display device;
identifying a pixel area, of a plurality of pixel areas of the display of the images by the display device, corresponding to the user gaze, including:
detecting a fixation gaze directed at the display of images, the fixation gaze being detected in response to movement of the user gaze having at least one of a magnitude or a frequency less than or equal to a set threshold; and
matching the pixel area with a corresponding object in the ambient environment, including:
identifying features within an area surrounding the pixel area;
searching an external database of previously stored images;
recognizing at least one of the features; and
matching the at least one of the features with the corresponding object in the ambient environment based on the searching of the external database.

11. The computing system of claim 10, wherein the camera is configured to capture images of portions of the ambient environment within a field of view of the camera as the wearable computing device changes at least one of position or orientation in the ambient environment, and the instructions cause the computing system to perform operations including:
identifying a fixation point of the fixation gaze at an intersection of the fixation gaze with the display of the images; and
identifying the pixel area at the intersection of the fixation gaze with the display of the images.

12. The computing system of claim 11, wherein the instructions cause the computing system to perform operations including:
analyzing the area surrounding the pixel area;
identifying the features within the area surrounding the pixel area based on the analyzing; and
matching the pixel area to the corresponding object based on the at least one of the features.

13. The computing system of claim 12, wherein the instructions cause the computing system to perform operations including:
recognizing at least one of the features based on known features of the ambient environment.

14. The computing system of claim 10, wherein the instructions also cause the computing system to perform operations including:
detecting a condition for entering a select mode of operation of the wearable computing device;
initiating operation of the wearable computing device in the select mode in response to detecting the condition; and
performing the tracking, the identifying and the matching only during operation of the wearable computing device in the select mode.

15. A non-transitory, machine-readable medium having instructions stored thereon that, when executed by a processor, cause a computing device to perform operations including:
capturing, by a camera mounted on a frame of a wearable computing device, images of objects within a field of view of the camera in an ambient environment outside of the wearable computing device;
triggering display, by a display device mounted on the frame of the wearable computing device, of the images captured by the camera;

tracking, by at least one gaze tracking device mounted on the frame of the wearable computing device, a user gaze directed at the display of the images by the display device;
identifying a pixel area, of a plurality of pixel areas of the display of the images by the display device, corresponding to the user gaze, including:
    detecting a fixation gaze directed at the display of images, the fixation gaze being detected in response to movement of the user gaze having at least one of a magnitude or a frequency less than or equal to a set threshold; and
    matching the pixel area with a corresponding object in the ambient environment, including:
        identifying features within an area surrounding the pixel area;
        recognizing at least one of the features based on a search of an external database of previously stored images; and
        matching the at least one of the features to the corresponding object in the ambient environment.

16. The non-transitory, machine-readable medium of claim 15, wherein the instructions also cause the computing device to perform operations including:
    detecting a condition for entering a select mode of operation of the wearable computing device;
    initiating operation of the wearable computing device in the select mode in response to detecting the condition; and
    performing the tracking, the identifying and the matching only during operation of the wearable computing device in the select mode.

17. The non-transitory, machine-readable medium of claim 15, wherein the instructions also cause the computing device to perform operations including:
    tracking, by at the least one gaze tracking device, eye gaze of at least one eye of a user of the wearable computing device;
    detecting the fixation gaze including fixation of the eye gaze directed at the display of the images;
    identifying a fixation point of the fixation gaze at an intersection of the fixation gaze with the display of the images; and
    identifying the pixel area at the intersection of the fixation gaze with the display of the images.

18. The non-transitory, machine-readable medium of claim 15, wherein the instructions also cause the computing device to perform operations including:
    analyzing the area surrounding the pixel area;
    identifying the features within the area surrounding the pixel area based on the analyzing; and
    matching the pixel area to the corresponding object based on the at least one identified feature.

19. The non-transitory, machine-readable medium of claim 18, wherein the instructions also cause the computing device to perform operations including:
    setting the corresponding object as a selected object; and
    providing for interaction with the selected object through the wearable computing device.

* * * * *